(12) United States Patent
Cagdaser

(10) Patent No.: US 9,380,211 B2
(45) Date of Patent: Jun. 28, 2016

(54) IMAGE STABILIZATION USING LIGHT SENSORS

(71) Applicant: INVENSENSE, INC., San Jose, CA (US)

(72) Inventor: Baris Cagdaser, Sunnyvale, CA (US)

(73) Assignee: INVENSENSE, INC., San Jose, CA (US)

( * ) Notice: Subject to any disclaimer, the term of this patent is extended or adjusted under 35 U.S.C. 154(b) by 39 days.

(21) Appl. No.: 14/210,256

(22) Filed: Mar. 13, 2014

(65) Prior Publication Data

US 2015/0264263 A1    Sep. 17, 2015

(51) Int. Cl.
*H04N 5/232* (2006.01)
*H04N 5/369* (2011.01)
*H04N 5/238* (2006.01)

(52) U.S. Cl.
CPC ........... *H04N 5/23254* (2013.01); *H04N 5/238* (2013.01); *H04N 5/23212* (2013.01); *H04N 5/23267* (2013.01); *H04N 5/23287* (2013.01); *H04N 5/3696* (2013.01)

(58) Field of Classification Search
None
See application file for complete search history.

(56) References Cited

U.S. PATENT DOCUMENTS

| | | | |
|---|---|---|---|
| 2003/0012565 A1* | 1/2003 | Otani | H04N 5/23287 396/52 |
| 2010/0302432 A1* | 12/2010 | Komuro | 348/340 |
| 2011/0013061 A1* | 1/2011 | Hoda et al. | 348/294 |
| 2012/0119068 A1* | 5/2012 | Numata | 250/208.1 |
| 2012/0133787 A1* | 5/2012 | Yamaguchi | 348/208.6 |

* cited by examiner

*Primary Examiner* — Albert Cutler
(74) *Attorney, Agent, or Firm* — Minisandram Law Firm; Raghunath S. Minisandram

(57) ABSTRACT

A method and system for image stabilization is disclosed. The image stabilization system includes a first pair of light sensors placed along an axis relative to a first axis, each light sensor is configured to provide a signal indicative of intensity of light received by the light sensor. The image stabilization system further includes a first directional light filter configured to selectively permit passage of incident light to the first pair of light sensors based on an angle of the incident light with reference to the first axis. An image stabilization circuit is configured to receive a pair of signals from the first pair of light sensors and generates a first signal indicative of a change in the angle of incidence of the incident light with reference to the first axis.

34 Claims, 12 Drawing Sheets

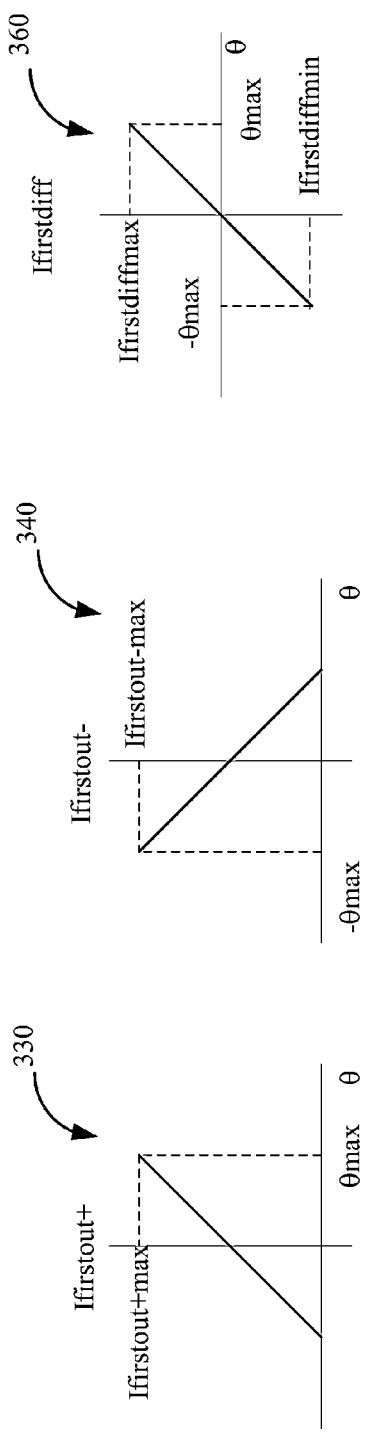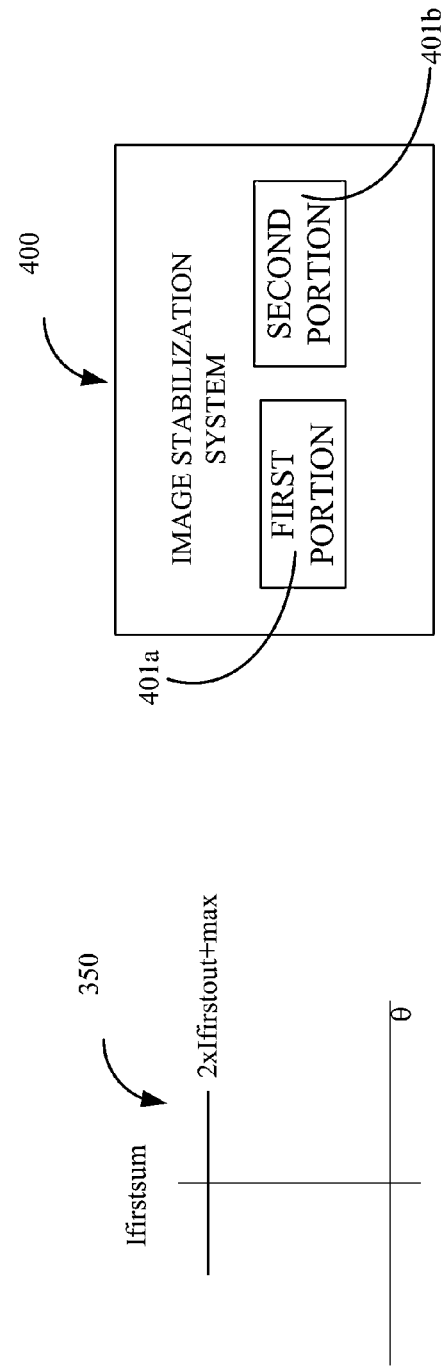

IMAGE STABILIZATION USING LIGHT SENSORS

TECHNICAL FIELD

The present invention relates generally to image stabilization systems and more particularly, to image stabilization systems using light sensors.

DESCRIPTION OF RELATED ART

Image stabilization is a common feature in modern cameras, with higher resolution. Hand jitter during the capture of an image blurs the image by changing the field-of-view (FOV) of the image sensor with respect to the object. Cameras generally sense a change in the FOV by using a motion sensor, generally a gyroscope. Gyroscopes directly measure the angular velocity to detect the motion of the image sensor's FOV.

Measured angular velocity by the gyroscope is used by either an optical image stabilization (OIS) system or an electronic image stabilization (EIS) system to correct errors due to changing FOV of the image sensor with respect to the object. In an OIS system, an actuator stabilizes the image by compensating either the position of the image sensor or the lens assembly. In an EIS system, actuator assembly is replaced by taking multiple images of the object and removing the blur in the image of the object by post-processing with motion sensor data.

OIS systems and EIS systems based on gyroscope may need additional parts to remove the blur in the image of the object. It may be desirable to come up with an improved image stabilization system.

With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, an image stabilization system is disclosed. The image stabilization system includes a first pair of light sensors placed along an axis relative to a first axis, each light sensor is configured to provide a signal indicative of intensity of light received by the light sensor. The image stabilization system further includes a first directional light filter configured to selectively permit passage of incident light to the first pair of light sensors based on an angle of the incident light with reference to the first axis. An image stabilization circuit is configured to receive a pair of signals from the first pair of light sensors and generates a first signal indicative of a change in the angle of incidence of the incident light with reference to the first axis.

In yet another embodiment, a method for image stabilization is disclosed. The method includes providing a first pair of light sensors placed along an axis relative to a first axis, each light sensor is configured to provide a signal indicative of intensity of light received by the light sensor. The method further includes providing a first directional light filter configured to selectively permit passage of incident light to the first pair of light sensors based on an angle of the incident light with reference to the first axis. An image stabilization circuit is provided, which is configured to receive a pair of signals from the first pair of light sensors and generate a first signal indicative of a change in the angle of incidence of the incident light with reference to the first axis.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the drawings, the same components have the same reference numerals. The illustrated embodiments are intended to illustrate but not limit the invention. The drawings include the following Figures:

FIG. 2A shows a graph showing the intensity of light reaching the light sensor of FIG. 2, based on an incident angle of an incident light, according to one aspect of the present disclosure;

FIG. 2B shows a graph showing the output of a readout circuit coupled to the light sensor of FIG. 2, as the incident angle of the incident light changes, according to one aspect of the present disclosure;

FIG. 3A shows a graph showing intensity of light passing through a first positive directional light filter of image stabilization system 300, based on an incident angle of an incident light, according to one aspect of the present disclosure;

FIG. 3B shows a graph showing intensity of light passing through a first negative directional light filter of image stabilization system 300, based on an incident angle of an incident light, according to one aspect of the present disclosure;

FIG. 3C shows a graph showing a value of Ifirstsum of image stabilization system 300, based on an incident angle of an incident light, according to one aspect of the present disclosure;

FIG. 3D shows a graph showing a value of Ifirstdiff of image stabilization system 300, based on an incident angle of an incident light, according to one aspect of the present disclosure;

FIG. 4 shows another example image stabilization system 400, with a first portion and a second portion, according to one aspect of the present disclosure;

DETAILED DESCRIPTION

To facilitate an understanding of the adaptive aspects of the present disclosure, an exemplary image stabilization system is described. The specific construction and operation of the adaptive aspects of the image stabilization system is further described with reference to exemplary image capture systems.

Figure 1:
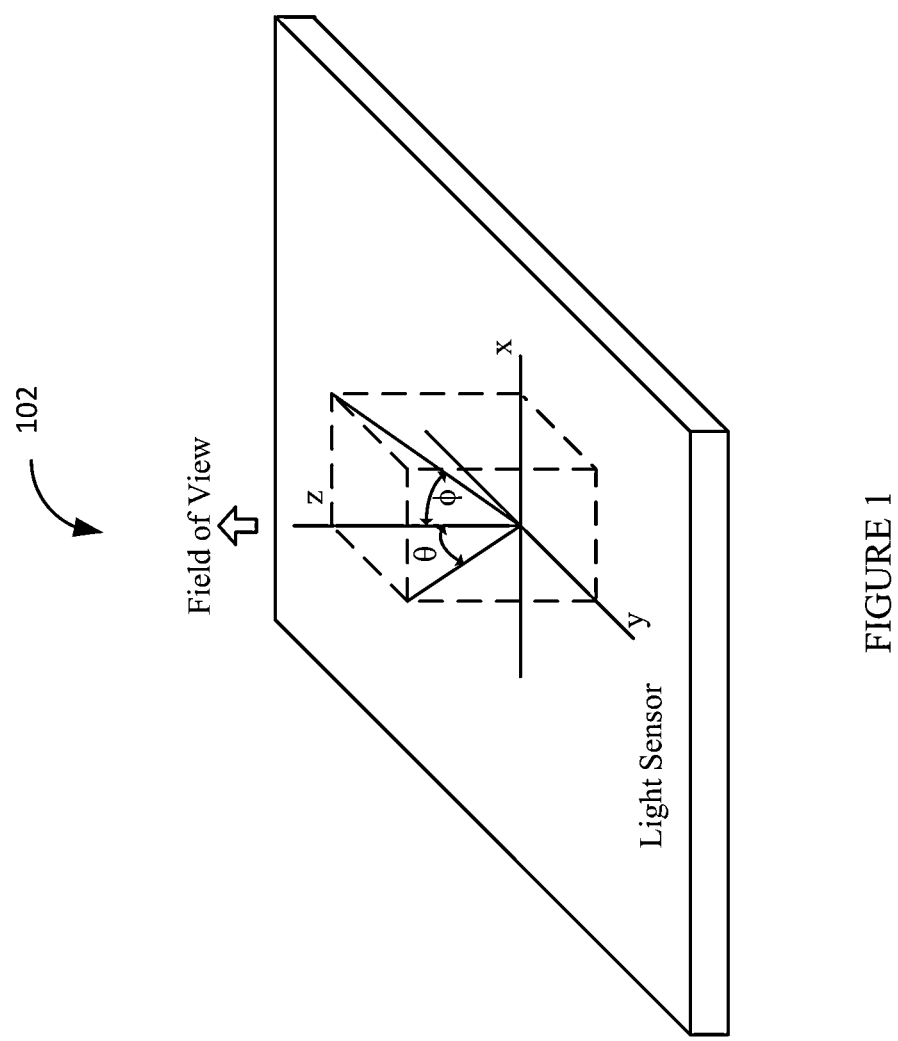
FIG. 1 shows an example light sensor, according to one aspect of the present disclosure.

FIG. 1 shows a light sensor 102. Light sensor may be sometimes referred to as a pixel. Light sensors in general measure the intensity of incoming light. In some examples, the light sensors detect the amount of charge generated in a silicon substrate due to incoming photons. The amount of light received by a light sensor 102 is limited to its field of view. As the light sensor moves, the field of view can change, which is defined in terms of the incident angles $\phi$ and $\theta$ for the incident light, with respect to the horizontal (x) and vertical (y) axes respectively, as shown in FIG. 1.

Figure 2:
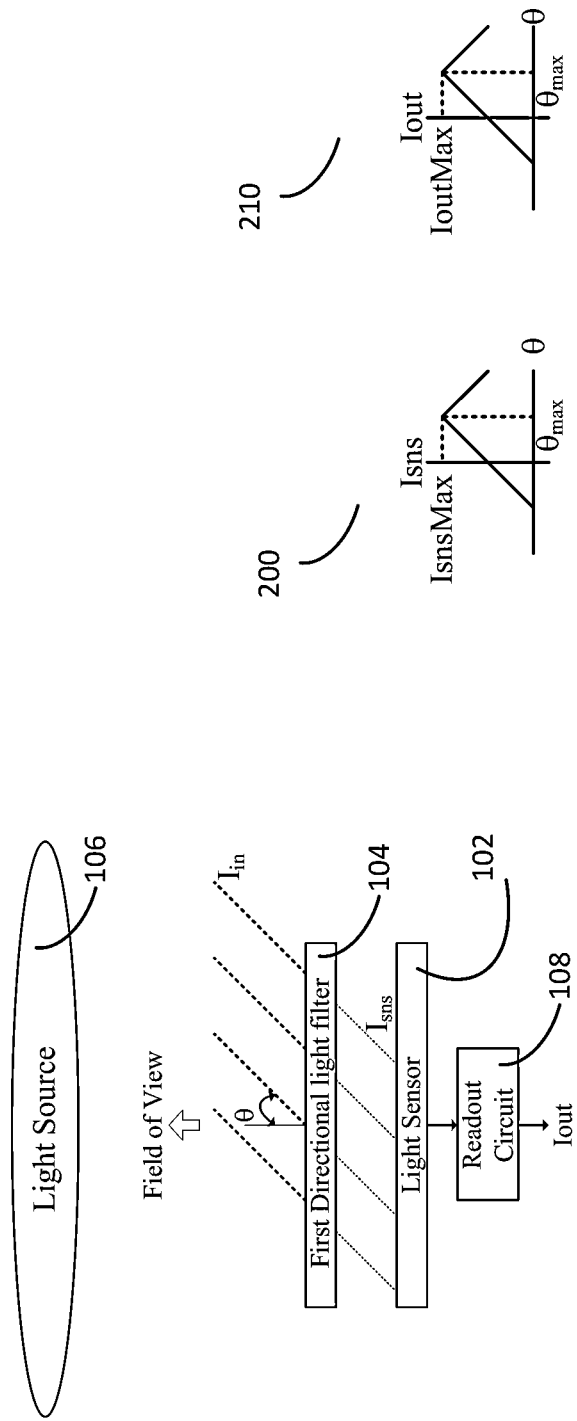
FIG. 2 shows an example light sensor of FIG. 1 with a first directional light filter, according to one aspect of the present disclosure.

Now, referring to FIG. 2, a light sensor 102 with a first directional light filter 104 placed between the light sensor 102 and a light source 106 is shown. Light source 106 provides an incident light Iin. The output of the light sensor 102 is coupled to a readout circuit 108, whose output Iout is proportional to the intensity of light passing through the first directional light filter 104. In this example, the first directional light filter 104 is placed along the y axis and corresponding incident angle is $\theta$. The first directional light filter 104 is configured such that the first directional light filter 104 selectively blocks the incoming light (intensity of which is shown as Iin), as the incident angle deviates from a preferred direction. Thus, the intensity of the light reaching the light sensor (Isns) becomes a function of the incident angle $\theta$. The output of the light sensor 102 is fed to the readout circuit 108, whose output Iout is proportional to the intensity of the light reaching the light sensor (Isns).

Now, referring to FIG. 2A, a graph 200 shows the intensity of light reaching the light sensor (Isns) as the incident angle $\theta$ changes. At an incident angle of $\theta$max, the intensity of light reaching the light sensor is maximum and is depicted as IsnsMax. As one skilled in the art appreciates, intensity IsnsMax may reach the intensity of incident light Iin, if the directional light filter 104 does not block any incident light at $\theta$max.

Now, referring to FIG. 2B, a graph 210 shows the output of the readout circuit 108, as the incident angle $\theta$ changes. At an incident angle of $\theta$max, the output of the readout circuit is maximum and is depicted as IoutMax.

As one skilled in the art appreciates, for image stabilization applications, the light source 106 substantially remains stationary while the field of view of the image sensor may change, for example, due to movement of the device with the image sensor. For example, device with the image sensor may be held by hand and field of view of the image sensor may change due to movement of the hand. The intensity of the incoming light (Iin) is not necessarily of a known intensity. Further, the light source may be subject to change, for example, depending upon the scene. In some examples, it is desirable to have a structure where the output of the readout circuit 108 is substantially normalized by the intensity of the incident light (Iin). Such a structure creates an output signal that is primarily a function of the incident angle.

Figure 3:
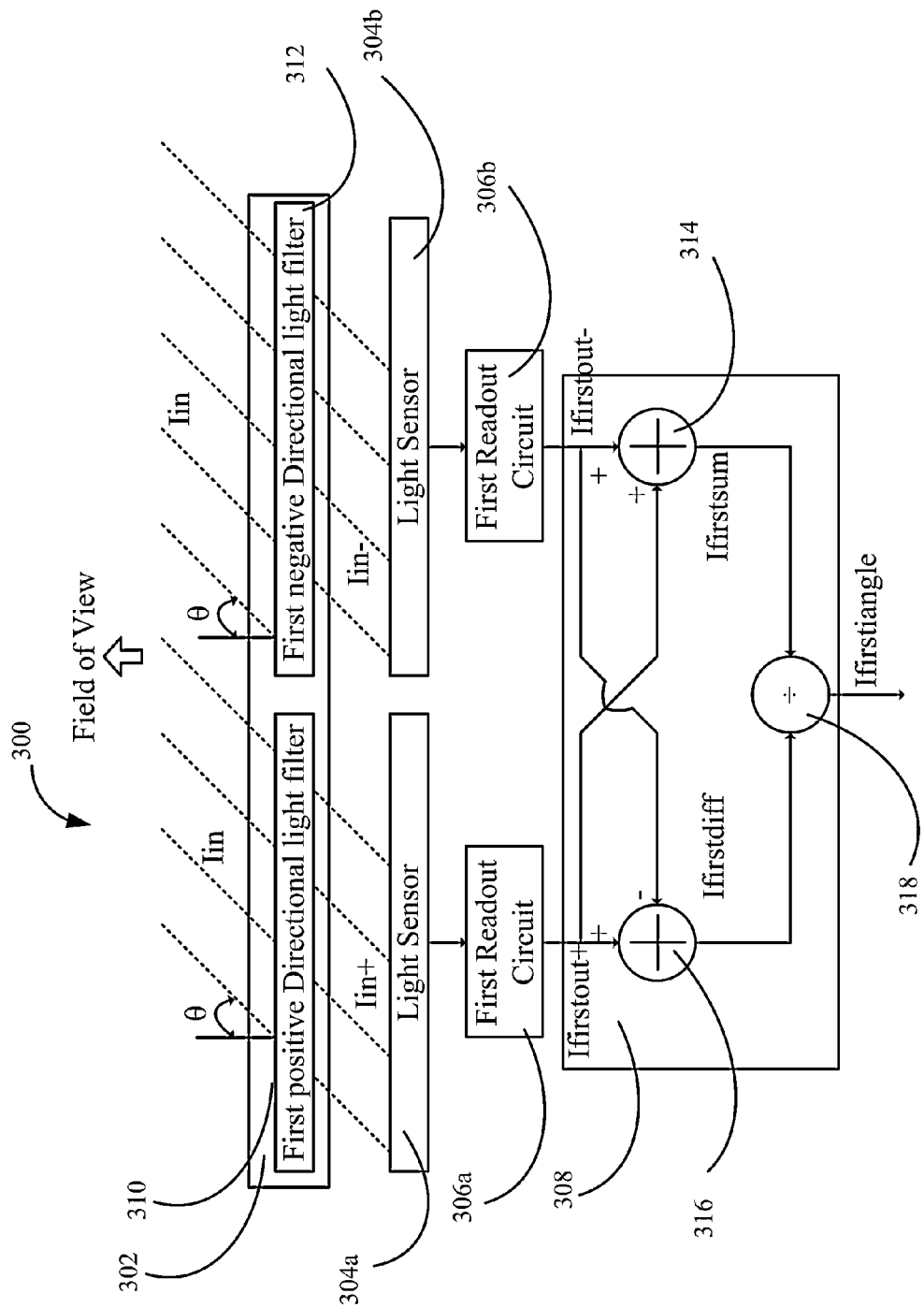
FIG. 3 shows an example image stabilization system 300, according to one aspect of the present disclosure.

Now referring to FIG. 3, an image stabilization system 300 is described. The image stabilization system 300 includes a first directional light filter 302, a first pair of light sensors 304a and 304b, a pair of first readout circuit 306a and 306b and a first image stabilization circuit 308. In one example, the first directional light filter 302 is placed along the y axis and corresponding incident angle is $\theta$. The first directional light filter 302 is configured such that the first directional light filter 302 blocks the incoming light (intensity of which is shown as Iin), as the incident angle deviates from a preferred direction.

The first directional light filter 302 further includes a first positive directional light filter 310 and a first negative directional light filter 312. The first positive directional light filter 310 is configured to receive the incident light (Iin) and selectively permit the incident light (Iin) to pass through and strike the first light sensor 304a, based on the incident angle of the incident light (Iin). For example, the light striking the first light sensor 304a is depicted as Iin+. The output of the first light sensor 304a is fed to the first readout circuit 306a. The output Ifirstout+ of the first readout circuit 306a is proportional to the intensity of the light Iin+ received by the first light sensor 304a.

The first negative directional light filter 312 is configured to receive the incident light (Iin) and selectively permit the incident light (Iin) to pass through and strike the first light sensor 304b, based on the incident angle of the incident light (Iin). For example, the light striking the first light sensor 304b is depicted as Iin−. The output of the first light sensor 304b is fed to the first readout circuit 306b. The output Ifirstout− of the first readout circuit 306b is proportional to the intensity of the light Iin− received by the first light sensor 304b.

In one example, the first positive directional light filter 310 and the first negative directional light filter 312 are configured such that amount of light passed through them have opposite dependency to the incident angle. This will be further explained with reference to FIGS. 3A and 3B.

Referring to FIG. 3A, graph 330, as the incident angle $\theta$ increases, the amount of light passed through the first positive directional light filter 310 increases, thereby, the intensity of Ifirstout+ increases. Further, as the incident angle $\theta$ decreases, the amount of light passed through the first positive directional light filter 310 decreases, thereby, the intensity of Ifirstout+ decreases. For example, at $\theta=\theta$max, Ifirstout+ is maximum and is shown as Ifirstout+ max.

Referring to FIG. 3B, graph 340, as the incident angle $\theta$ increases, the amount of light passed through the first negative directional light filter 312 decreases, thereby, the intensity of Ifirstout− decreases. Further, as the incident angle $\theta$ decreases, the amount of light passed through the first negative directional light filter 312 increases, thereby, the intensity of Ifirstout− increases. For example, at $\theta=-\theta$max, Ifirstout− is maximum and is shown as Ifirstout-max.

Now, referring back to FIG. 3, the first image stabilization circuit 308 will be further explained. The first image stabilization circuit 308 further includes a first add circuit 314, a first subtract circuit 316 and a first divide circuit 318. The first add circuit 314 is configured to receive output Ifirstout+ of first readout circuit 306a and output Ifirstout− of first readout circuit 306b and generate an output Ifirstsum indicative of the sum of the output of the first readout circuit 306a and 306b. The first subtract circuit 316 is configured to receive output Ifirstout+ of first readout circuit 306a and output Ifirstout− of first readout circuit 306b and generate an output Ifirstdiff indicative of the difference between the output of the first readout circuit 306a and 306b. As one skilled in the art appreciates, output Ifirstsum is proportional to the intensity of incident light Iin and output Ifirstdiff is proportional to both the intensity of incident light Iin and incident angle θ. This will be further explained with reference to FIG. 3C and FIG. 3D.

Now referring to FIG. 3C, graph 350 shows that the value of Ifirstsum is constant, regardless of the incident angle θ. In some examples, if Ifirstout+ max and Ifirstout-max are substantially equal, the Ifirstsum will be two times Ifirstout+ max. Now, referring to FIG. 3D, graph 360, we notice that the value of Ifirstdiff is proportional to both the intensity of incident light Iin and incident angle θ. As incident angle θ increases, Ifirstdiff increases and as incident angle θ decreases, Ifirstdiff decreases. For example, at incident angle+θmax, the Ifirstdiff is maximum and is shown as Ifirstdiffmax. At incident angle −θmax, the Ifirstdiff is minimum and is shown as Ifirstdiffmin.

Now, referring back to FIG. 3, the output Ifirstdiff of the first subtract circuit 316 and the output Ifirstsum of the first add circuit 314 are fed to the first divider circuit 318. The first divider circuit 318 divides the Ifirstdiff by Ifirstsum and provides an output signal Ifirstiangle, which is substantially proportional to the incident angle only. Output signal Ifirstiangle may be used to generate a correction signal, based on changes to the incident angle.

As previously disclosed, the first directional light filter 302 is placed along the y axis and corresponding incident angle is θ. The first image stabilization circuit 308 of the image stabilization system 300 generates an output signal Ifirstiangle, which is substantially proportional to the incident angle θ only. In some examples, the image stabilization system may be further configured to generate an output signal that is substantially proportional to incident angle φ, which will be further described with reference to FIG. 4.

Now referring to FIG. 4, another example image stabilization system 400 is described. The image stabilization system 400 is configured to generate a first output signal that is substantially proportional to the incident angle θ, using a first portion 401A. Construction and operation of first portion 401A is substantially similar to image stabilization system 300, as previously described with reference to FIG. 3. Additionally, the image stabilization system 400 is also configured to generate a second output signal that is substantially proportional to the incident angle φ, using a second portion 401b. Construction and operation of second portion 401B is substantially similar to image stabilization system 300, as previously described with reference to FIG. 3, except that orientation of various elements are organized such that the second output signal that is generated is substantially proportional to a different incident angle, in this case, an incident angle φ. Now, referring to FIG. 4A and FIG. 4B, first portion 401A and second portion 401B will be described in detail.

Figure 4A:
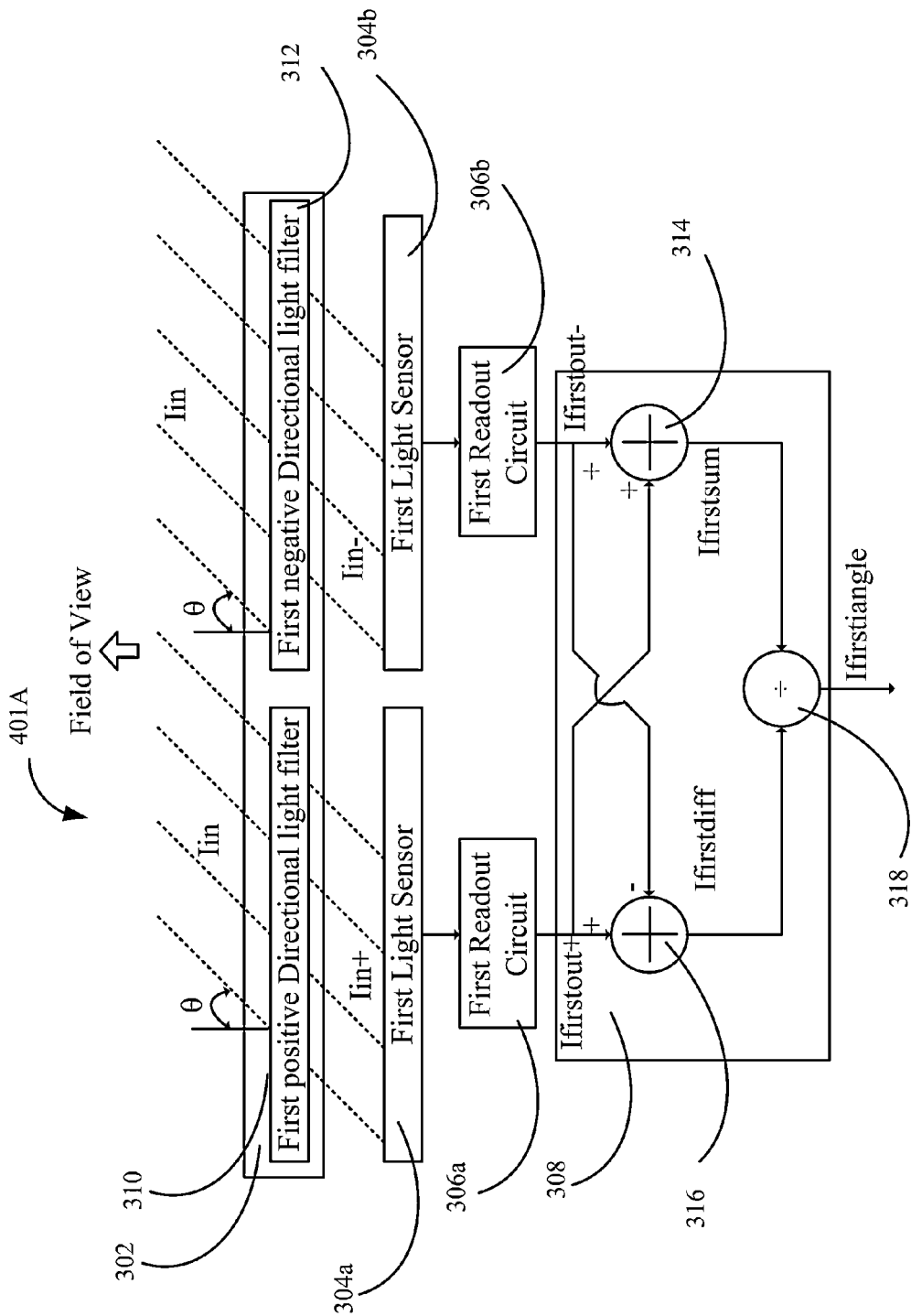
FIG. 4A shows an example first portion of image stabilization system 400, according to one aspect of the present disclosure.

Now, referring to FIG. 4A, the first portion 401A of the image stabilization system 400 includes a first directional light filter 302, a first pair of light sensors 304a and 304b, a pair of first readout circuit 306a and 306b and a first image stabilization circuit 308. In one example, the first directional light filter 302 is placed along the y axis and corresponding incident angle is θ. The first directional light filter 302 is configured such that the first directional light filter 302 blocks the incoming light (intensity of which is shown as Iin), as the incident angle deviates from a preferred direction.

The first directional light filter 302 further includes a first positive directional light filter 310 and a first negative directional light filter 312. The first positive directional light filter 310 is configured to receive the incident light (Iin) and selectively permit the incident light (Iin) to pass through and strike the first light sensor 304a, based on the incident angle of the incident light (Iin). For example, the light striking the first light sensor 304a is depicted as Iin+. The output of the first light sensor 304a is fed to the first readout circuit 306a. The output Ifirstout+ of the first readout circuit 306a is proportional to the intensity of the light Iin+ received by the first light sensor 304a.

The first negative directional light filter 312 is configured to receive the incident light (Iin) and selectively permit the incident light (Iin) to pass through and strike the first light sensor 304b, based on the incident angle of the incident light (Iin). For example, the light striking the first light sensor 304b is depicted as Iin−. The output of the first light sensor 304b is fed to the first readout circuit 306b. The output Ifirstout− of the first readout circuit 306b is proportional to the intensity of the light Iin− received by the first light sensor 304b.

In one example, the first positive directional light filter 310 and the first negative directional light filter 312 are configured such that amount of light passed through them have opposite dependency to the incident angle, as previously described with reference to FIGS. 3A and 3B.

The first image stabilization circuit 308 further includes a first add circuit 314, a first subtract circuit 316 and a first divide circuit 318. The first add circuit 314 is configured to receive output Ifirstout+ of first readout circuit 306a and output Ifirstout− of first readout circuit 306b and generate an output Ifirstsum indicative of the sum of the output of the first readout circuit 306a and 306b. The first subtract circuit 316 is configured to receive output Ifirstout+ of first readout circuit 306a and output Ifirstout− of first readout circuit 306b and generate an output Ifirstdiff indicative of the difference between the output of the first readout circuit 306a and 306b. As one skilled in the art appreciates, output Ifirstsum is proportional to the intensity of incident light Iin and output Ifirstdiff is proportional to both the intensity of incident light Iin and incident angle θ, as previously explained with reference to FIG. 3C and FIG. 3D.

The output Ifirstdiff of the first subtract circuit 316 and the output Ifirstsum of the first add circuit 314 are fed to the first divider circuit 318. The first divider circuit 318 divides the Ifirstdiff by Ifirstsum and provides an output signal Ifirstiangle, which is substantially proportional to the incident angle only. Output signal Ifirstiangle may be used to generate a correction signal, based on changes to the incident angle θ.

Figure 4B:
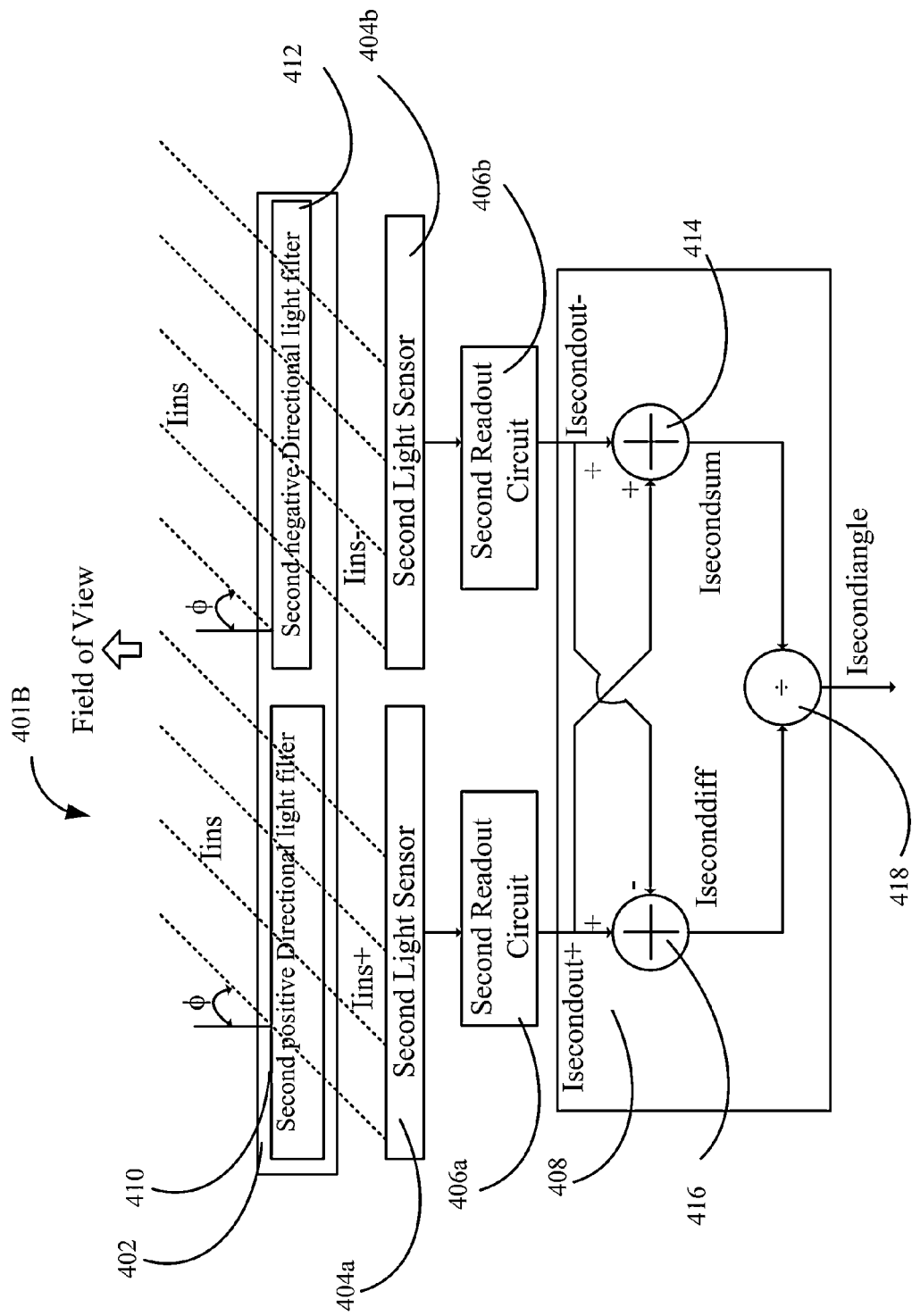
FIG. 4B shows an example second portion of image stabilization system 400, according to one aspect of the present disclosure.

Now, referring to FIG. 4B, the second portion 401B of the image stabilization system 400 includes a second directional light filter 402, a second pair of light sensors 404a and 404b, a pair of second readout circuit 406a and 406b and a second image stabilization circuit 408. In one example, the second directional light filter 402 is placed along the x axis and corresponding incident angle is 4. The second directional light filter 402 is configured such that the second directional light filter 402 blocks the incoming light (intensity of which is shown as Iins), as the incident angle deviates from a preferred direction.

The second directional light filter 402 further includes a second positive directional light filter 410 and a second negative directional light filter 412. The second positive directional light filter 410 is configured to receive the incident light (Iins) and selectively permit the incident light (Iins) to pass through and strike the second light sensor 404a, based on the incident angle of the incident light (Iins). For example, the light striking the second light sensor 404a is depicted as Iins+. The output of the second light sensor 404a is fed to the second readout circuit 406a. The output Isecondout+ of the second readout circuit 406a is proportional to the intensity of the light Iins+ received by the second light sensor 404a.

The second negative directional light filter 412 is configured to receive the incident light (Iins) and selectively permit the incident light (Iins) to pass through and strike the second light sensor 404b, based on the incident angle of the incident light (Iins). For example, the light striking the second light sensor 404b is depicted as Iins−. The output of the second light sensor 404b is fed to the second readout circuit 406b. The output Isecondout− of the second readout circuit 306b is proportional to the intensity of the light Iins− received by the second light sensor 404b.

In one example, the second positive directional light filter 410 and the second negative directional light filter 412 are configured such that amount of light passed through them have opposite dependency to the incident angle. For example, as previously described with reference to FIGS. 3A and 3B for image stabilization system 300.

The second image stabilization circuit 408 further includes a second add circuit 414, a second subtract circuit 416 and a second divide circuit 418. The second add circuit 414 is configured to receive output Isecondout+ of second readout circuit 406a and output Isecondout− of second readout circuit 406b and generate an output Isecondsum indicative of the sum of the output of the second readout circuit 406a and 406b. The second subtract circuit 416 is configured to receive output Isecondout+ of second readout circuit 406a and output Isecondout− of second readout circuit 406b and generate an output Iseconddiff indicative of the difference between the output of the second readout circuit 406a and 406b. As one skilled in the art appreciates, output Isecondsum is proportional to the intensity of incident light Iins and output Iseconddiff is proportional to both the intensity of incident light Iin and incident angle ϕ. For example, as previously explained with reference to FIG. 3C and FIG. 3D for image stabilization system 300.

The output Iseconddiff of the second subtract circuit 416 and the output Isecondsum of the second add circuit 414 are fed to the second divider circuit 418. The second divider circuit 418 divides the Iseconddiff by Isecondsum and provides an output signal Isecondiangle, which is substantially proportional to the incident angle only. Output signal Isecondiangle may be used to generate a correction signal, based on changes to the incident angle ϕ.

In some examples, a combination of a directional light filter and corresponding light sensor may be sometimes referred to as a directional light pixel. For example, referring to FIG. 4A, a combination of a first positive directional light filter 310 and corresponding first light sensor 304a may be referred to as a first positive directional light pixel 320. Similarly, a combination of a first negative directional filter 312 and corresponding first light sensor 304b may be referred to as a first negative directional light pixel 322. Now, referring to FIG. 4B, a combination of a second positive directional light filter 410 and corresponding second light sensor 404a may be referred to as a second positive directional light pixel 420. Similarly, a combination of a second negative directional filter 412 and corresponding second light sensor 404b may be referred to as a second negative directional light pixel 422.

Figure 4C:
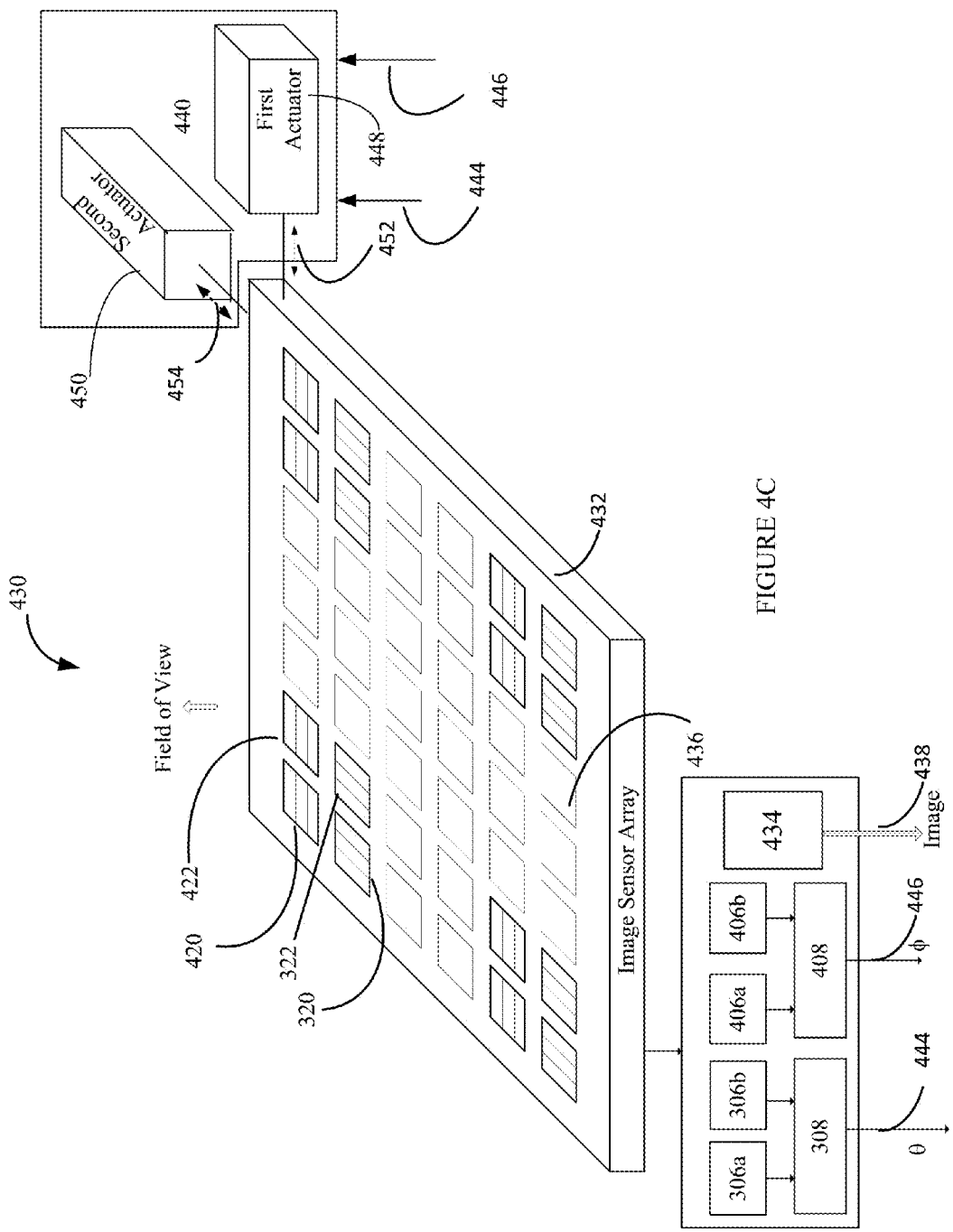
FIG. 4C shows an example image capture system 430, according to one aspect of the present disclosure.

Now, referring to FIG. 4C, an example image capture system 430 is disclosed. The image capture system 430 includes an image sensor array 432 and an image processor 434. The image sensor array 432 includes a plurality of image sensors 436. Output of the image sensors 436 are processed by the image processor 434 to generate image signals 438 indicative of an image captured by the image sensor array 432.

In this example, some of the image sensors are configured as directional light pixels, with the addition of corresponding directional light filters. For example, the image sensor array 432 has a plurality of first positive directional light pixel 320, a plurality of first negative directional light pixel 322, a plurality of second positive directional light pixel 420 and a plurality of second negative light pixel 422.

The output of the first positive directional light pixel 320 is fed to a first readout circuit 306a and the output of the first negative directional light pixel 322 is fed to a first readout circuit 306b. The output of both first readout circuit 306a and 306b are fed to the first image stabilization circuit 308. As previously described, the first image stabilization circuit 308 is configured to generate a signal which will be indicative of the incident angle of incident light. In this example, the signal will be indicative of the incident angle of θ. Based on the signal indicative of the incident angle of θ, the first image stabilization circuit 308 may be further configured to generate a first signal 444 indicative of a change in the incident angle of θ.

Similarly, the output of the second positive directional light pixel 420 is fed to a second readout circuit 406a and the output of the second negative directional light pixel 422 is fed to a second readout circuit 406b. The output of both second readout circuits 406a and 406b are fed to the second image stabilization circuit 408. As previously described, the second image stabilization circuit 408 is configured to generate a signal which will be proportional to the incident angle of the incident light. In this example, incident angle of ϕ. Based on the signal indicative of the incident angle of ϕ, the second image stabilization circuit 408 may be further configured to generate a second signal 446 indicative of a change in the incident angle of ϕ.

The image capture system 430 further includes a correction assembly 440. The correction assembly 440 is configured to move the image sensor array 432. For example, the correction assembly 440 includes a first actuator 448 and a second actuator 450. In one example, the first actuator 448 is configured to move the image sensor array 432 along X axis, as shown by arrow 452. In one example, the second actuator 450 is configured to move the image sensor array 432 along Y axis, as shown by arrow 454. As previously discussed, in one example, the first signal 444 is indicative of a change in the incident angle of θ, which corresponds to a change in the field of view corresponding to X axis. The first signal 444 is used by the correction assembly 440 to generate a first correction signal that is applied to the first actuator 448 to selectively move the first actuator 448 so that the a constant incident angle is maintained for the incident light, along the X axis. Similarly, the second signal 446 is indicative of a change in the incident angle of ϕ, which corresponds to a change in the field of view corresponding to Y axis. The second signal 446 is used by the correction assembly 440 to generate a second correction signal that is applied to the second actuator 450 to selectively move the second actuator 450 so that the a constant incident angle is maintained for the incident light, along the Y axis.

As one skilled in the art appreciates, selective movement of the image sensor array 432 results in removing any distortion of the image captured by the image sensor array 432. For example, the image signals 438 indicative of an image captured by the image sensor array 432 will be substantially without any distortion or blur. As an example, by selective movement of the image sensor array 432 results in the position of the image formed on the image sensor array 432 to be substantially same.

Figure 4D:
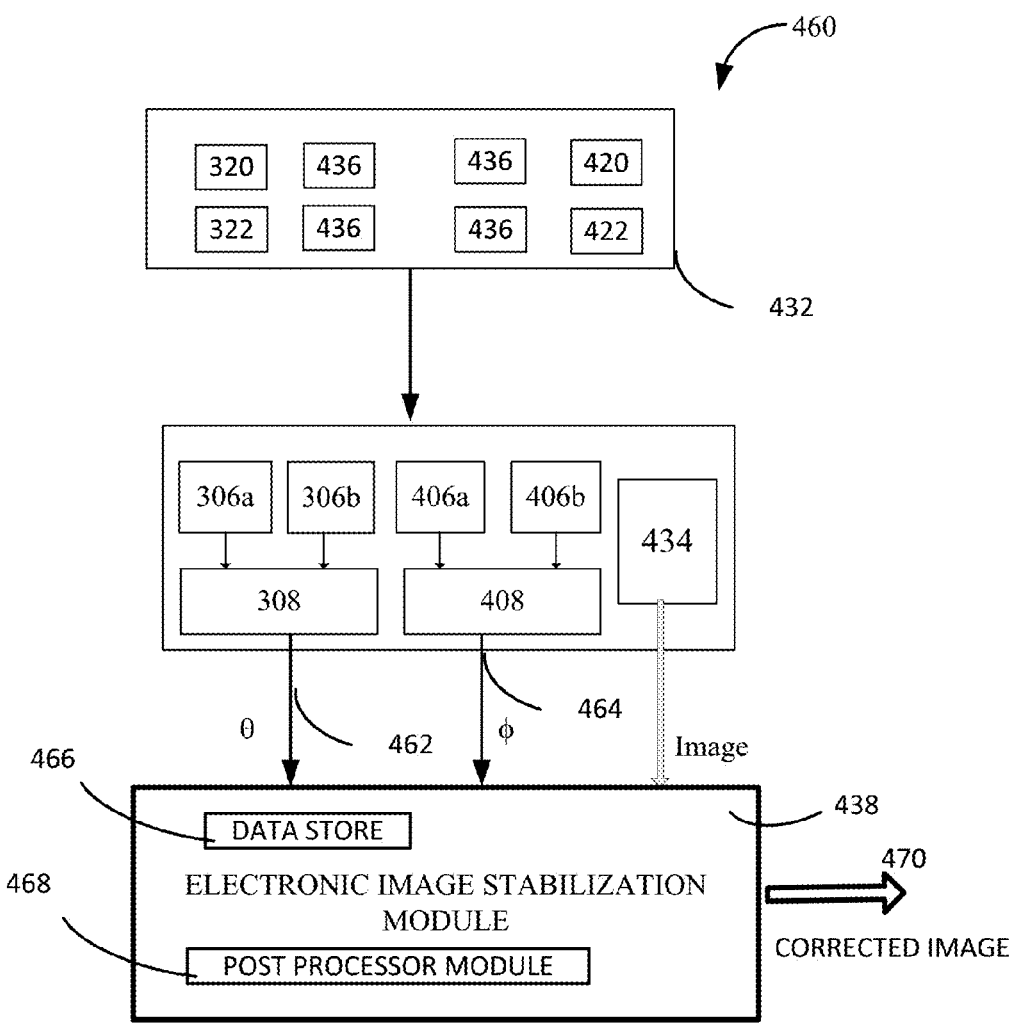
FIG. 4D shows another example image capture system 460, according to one aspect of the present disclosure.

Now, referring to FIG. 4D, an alternate example image capture system 460 is disclosed. The image capture system 460 is similar to the image capture system 430. The image capture system 460 includes an image sensor array 432 which includes a plurality of image sensors 436. Output of the image sensors 436 are processed by the image processor 434 to generate image signals 438 indicative of an image captured by the image sensor array 432. Some of the image sensors are configured as first positive directional light pixel 320, first negative directional light pixel 322, second positive directional light pixel 420 and second negative directional light pixel 422.

The output of the first positive directional light pixel 320 is fed to a first readout circuit 306a and the output of the first negative directional light pixel 322 is fed to a first readout circuit 306b. The output of both first readout circuit 306a and 306b are fed to the first image stabilization circuit 308. As previously described, the first image stabilization circuit 308 is configured to generate a signal which will be indicative of the incident angle of incident light. In this example, the signal will be indicative of the incident angle of θ. For example, signal 462.

Similarly, the output of the second positive directional light pixel 420 is fed to a second readout circuit 406a and the output of the second negative directional light pixel 422 is fed to a second readout circuit 406b. The output of both second readout circuits 406a and 406b are fed to the second image stabilization circuit 408. As previously described, the second image stabilization circuit 408 is configured to generate a signal which will be proportional to the incident angle of the incident light. In this example, incident angle of 4. For example, signal 464.

However instead of using one or more actuators to move the image sensor, as described with respect to image stabilization system 430, in this example, an electronic image stabilization module 438 captures a plurality of frames of image along with information related to the incident angle of the incident light for each frame of captured image. For example, captured image and incident angle θ and φ corresponding to each frame of captured image is stored in a data store 466. Then, each frame of captured image is processed by a post processor module 468 of the electronic image stabilization module 462. The post processor module 468 processes each frame of captured image along with the corresponding incident angle to generate a corrected frame of image. Sometimes, this is referred to as de-blurring the image. The corrected frame of image 470 is outputted by the electronic image stabilization module 462 for further processing and storage.

In one example, additional image sensors are provided on the image sensor array, outside the visible frame. As directional light sensors detect a motion, the image formed on the image sensors for the frame is moved in a way to minimize the impact of changing FOV. For example, using the first signal indicative of the change in the incident angle with reference to the first axis and the second signal indicative of the change in the incident angle with reference to the second axis, the image formed on the image sensors for the frame is moved in a way to minimize the impact of changing FOV. For example, the first signal and second signal may be recorded along with the image capture data to move the captured image.

In another example multiple frames of images are recorded along with the change in FOV, for a single image capture. An electronic image stabilization module later removes the motion of the image by combining multiple frames according to the change in FOV during the capture to generate a modified image to represent the captured image. For example, using the first signal indicative of the change in the incident angle with reference to the first axis and the second signal indicative of the change in the incident angle with reference to the second axis, a modified image may be formed to represent the captured image. For example, the first signal and second signal may be recorded along with the image capture data to perform the modification.

In some examples, the image data captured by the light sensors of first positive directional light pixel 320 and first negative directional light pixel 322 may be corrected by the post processor module 468, based on the signal indicative of the angle of the incident light. For example, correcting the intensity of the image data of the light sensors, based on the angle of the incident light. Similarly, the image data captured by the light sensors of second positive directional light pixel 420 and second negative directional light pixel 422 may be corrected by the post processor module 468, based on the signal indicative of the angle of the incident light. For example, correcting the intensity of the image data of the light sensors, based on the angle of the incident light.

Figure 4E:
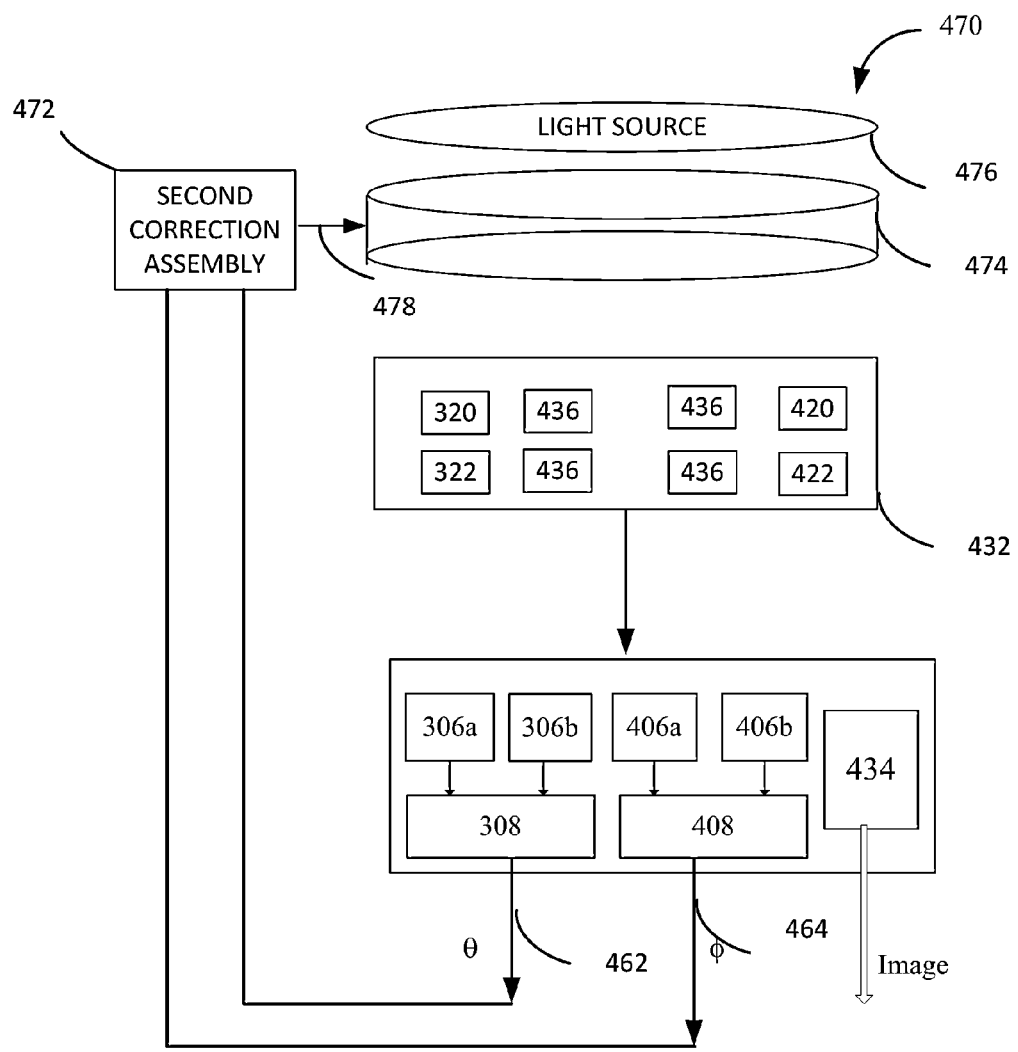
FIG. 4E shows yet another example image capture system 470, according to one aspect of the present disclosure.

Now, referring to FIG. 4E, yet another example image capture system 470 is disclosed. The image capture system 470 is similar to the image capture system 460. The image capture system 470 includes an image sensor array 432 which includes a plurality of image sensors 436. Output of the image sensors 436 are processed by the image processor 434 to generate image signals 438 indicative of an image captured by the image sensor array 432. Some of the image sensors are configured as first positive directional light pixel 320, first negative directional light pixel 322, second positive directional light pixel 420 and second negative directional light pixel 422.

The output of the first positive directional light pixel 320 is fed to a first readout circuit 306a and the output of the first negative directional light pixel 322 is fed to a first readout circuit 306b. The output of both first readout circuit 306a and 306b are fed to the first image stabilization circuit 308. As previously described, the first image stabilization circuit 308 is configured to generate a signal which will be indicative of the incident angle of incident light. In this example, the signal will be indicative of the incident angle of θ. For example, signal 462.

Similarly, the output of the second positive directional light pixel 420 is fed to a second readout circuit 406a and the output of the second negative directional light pixel 422 is fed to a second readout circuit 406b. The output of both second readout circuits 406a and 406b are fed to the second image stabilization circuit 408. As previously described, the second image stabilization circuit 408 is configured to generate a signal which will be proportional to the incident angle of the incident light. In this example, incident angle of φ. For example, signal 464.

However instead of using an electronic image stabilization module 438, as described with respect to image stabilization system 460, in this example, a second correction assembly 472 is used to selectively move a lens assembly 474 disposed between a light source 476 and the image sensor array 432 to selectively move the image formed on the image sensor array 432. For example, signal 462 and signal 464 are fed to the second correction assembly 472 to generate a signal 478 to selectively move the lens assembly 474. This movement of the lens assembly changes the incident angle of an incident light reaching the image sensor array 432. The lens assembly is selectively moved so as to maintain the position of the image formed on the image sensor array 432 substantially constant, thereby removing any blur in the captured image. As one skilled in the art appreciates, the lens assembly 474 is configured to be moved both in the X axis (horizontal) and Y axis (vertical), based on the incident angle θ and φ, based on the signal 478.

In some examples, the second correction assembly 472 may be similar to the correction assembly 440 described with reference to FIG. 4C. In some examples, a housing (not shown) may contain the lens assembly 474, which may be selectively moved so as to maintain the position of the image formed on the image sensor array 432 substantially constant, thereby removing any blur in the captured image.

Figure 4F:
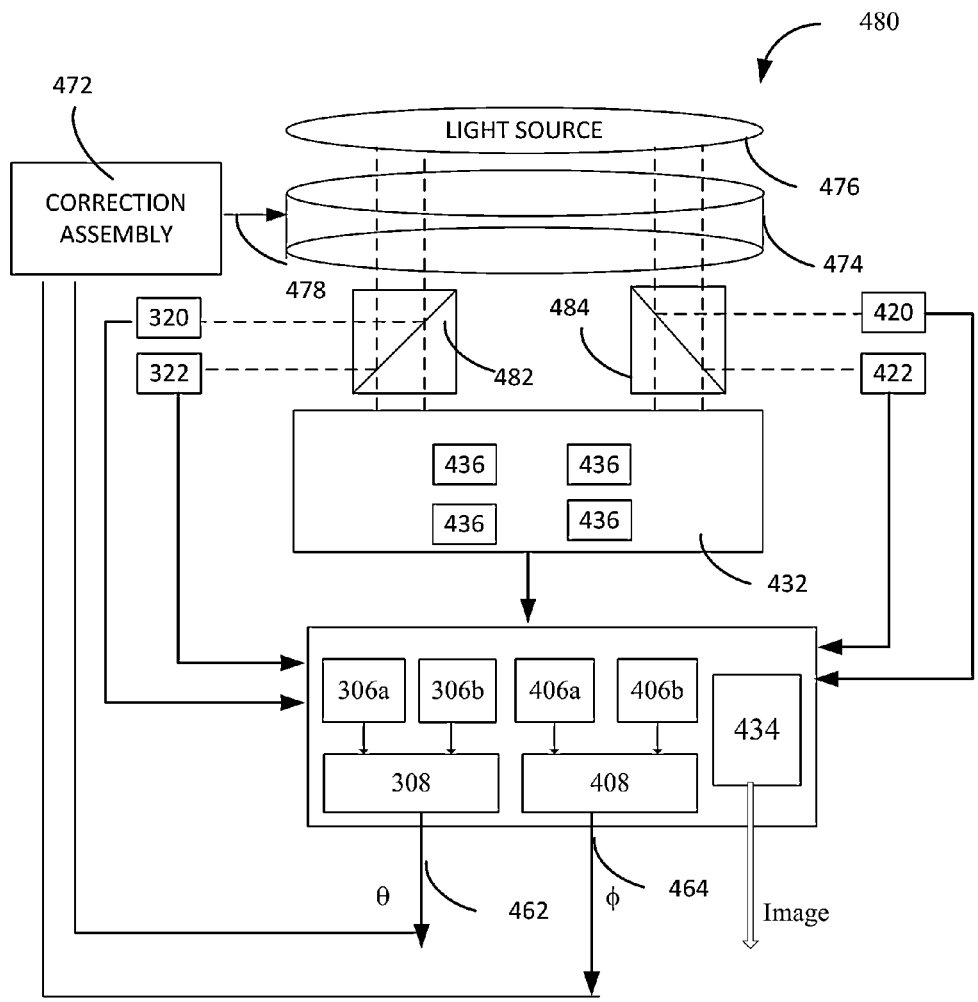
FIG. 4F shows yet another example image capture system 480, according to one aspect of the present disclosure.

Now, referring to FIG. 4F, yet another example image capture system 480 is disclosed. The image capture system 480 is similar to the image capture system 470. The image capture system 480 includes an image sensor array 432 which includes a plurality of image sensors 436. Output of the image sensors 436 are processed by the image processor 434 to generate image signals 438 indicative of an image captured by the image sensor array 432.

In this example, first positive directional light pixel 320, first negative directional light pixel 322, second positive directional light pixel 420 and second negative directional light pixel 422 are formed independent of the image sensor array. A first mirror assembly 482 selectively diverts a portion of the incident light to impinge upon the first positive directional light pixel 320 and the first negative directional light pixel 322. A second mirror assembly selectively diverts a portion of the incident light to impinge upon the second positive directional light pixel 420 and second negative directional light pixel 422. As one skilled in the art appreciates, the first mirror assembly 482 and the second mirror assembly 484 diverts a portion of the incident light at a known angle with reference to the angle of incidence of the incident light. For example, at 45 degrees to the angle of incidence of the incident light.

Further, the first positive directional light pixel 320, first negative directional light pixel 322, second positive directional light pixel 420 and second negative directional light pixel 422 are positioned such that the incident angle of the portion of the incident light received by them is substantially same as the incident angle of the incident light received by the image sensors 436 in the image sensor array 432.

The output of the first positive directional light pixel 320 is fed to a first readout circuit 306a and the output of the first negative directional light pixel 322 is fed to a first readout circuit 306b. The output of both first readout circuit 306a and 306b are fed to the first image stabilization circuit 308. As previously described, the first image stabilization circuit 308 is configured to generate a signal which will be indicative of the incident angle of incident light. In this example, the signal will be indicative of the incident angle of θ. For example, signal 462.

Similarly, the output of the second positive directional light pixel 420 is fed to a second readout circuit 406a and the output of the second negative directional light pixel 422 is fed to a second readout circuit 406b. The output of both second readout circuits 406a and 406b are fed to the second image stabilization circuit 408. As previously described, the second image stabilization circuit 408 is configured to generate a signal which will be proportional to the incident angle of the incident light. In this example, incident angle of 4. For example, signal 464.

A correction assembly 472 is used to selectively move a lens assembly 474 disposed between a light source 476 and the image sensor array 432 to selectively move the image formed on the image sensor array 432. For example, signal 462 and signal 464 are fed to the correction assembly to generate a signal 478 to selectively move the lens assembly 474. This movement of the lens assembly changes the incident angle of an incident light reaching the image sensor array 432. The lens assembly is selectively moved so as to maintain the position of the image formed on the image sensor array 432 substantially constant, thereby removing any blur in the captured image. As one skilled in the art appreciates, the lens assembly 474 is configured to be moved both in the X axis (horizontal) and Y axis (vertical), based on the incident angle θ and φ, based on the signal 478.

Figure 5:
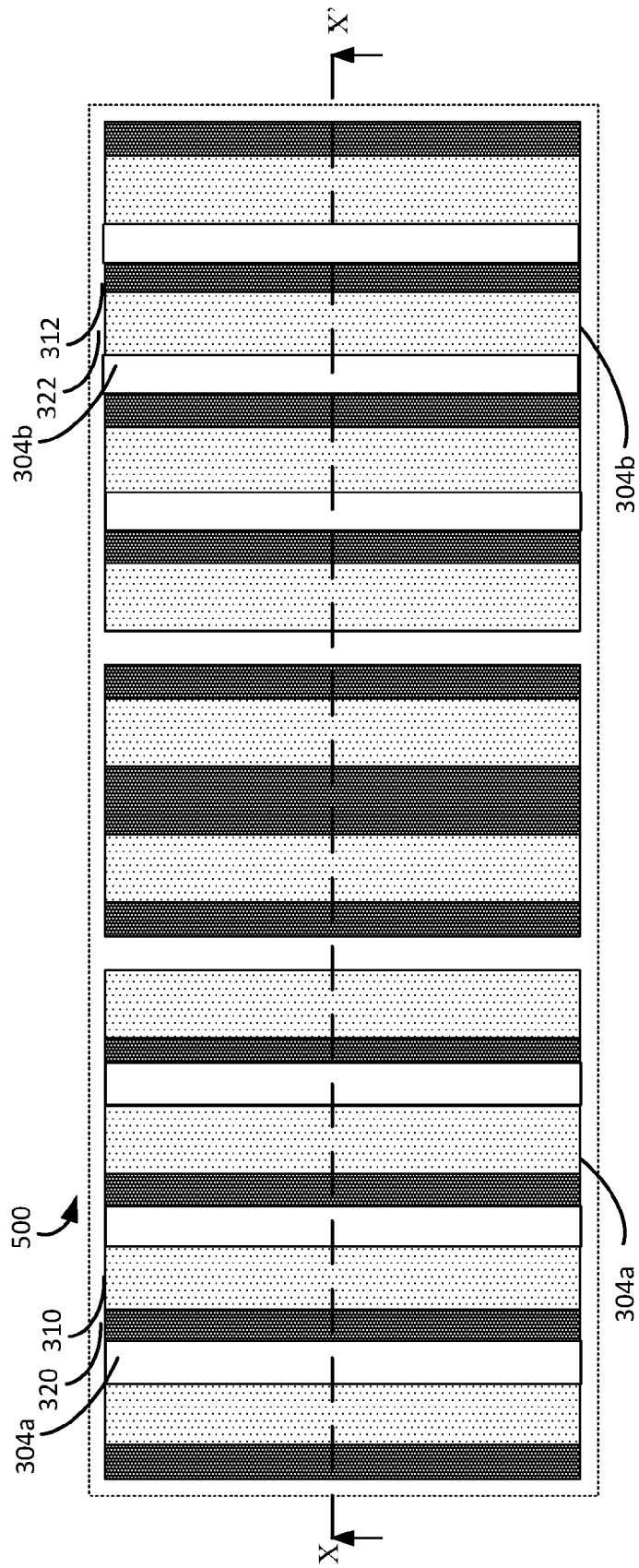
FIG. 5 shows top view of a pair of directional light pixels formed in a semiconductor device, according to one aspect of the present disclosure.
Figure 5A:
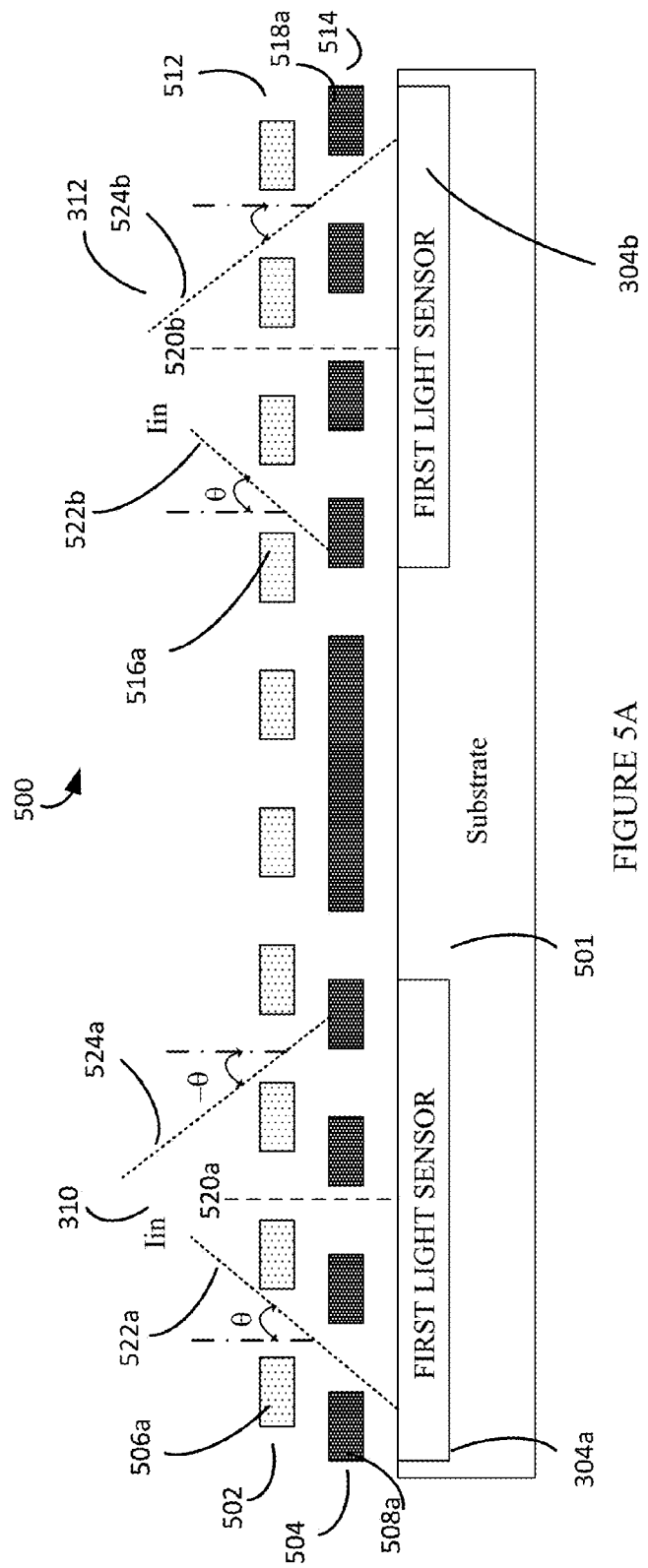
FIG. 5A shows a cross-sectional view of pair of directional light pixels of FIG. 5, along the line X-X', according to one aspect of the present disclosure.

Now, referring to FIGS. 5 and 5a, an example construction of a pair of directional light pixels in a semiconductor device is disclosed. FIG. 5 shows top view of a pair of directional light pixels 500. The pair of directional light pixels 500 includes a first positive directional light pixel 320 and a first negative directional light pixel 322. As previously disclosed with reference to FIG. 4, a combination of the first positive directional light filter 310 and corresponding first light sensor 304a is referred to as the first positive directional light pixel 320. Similarly, a combination of a first negative directional filter 312 and corresponding first light sensor 304b is referred to as a first negative directional light pixel 322. Portions of first light sensor 304a and portions of first light sensor 304b are shown in FIG. 5. Now referring to FIG. 5b, pair of directional light pixels 500 is further described.

FIG. 5b shows a cross-sectional view of the pair of directional light pixels 500 of FIG. 5, along the line X-X'. A pair of first light sensors 304a and 304b are formed on a substrate 502. The first positive directional light filter 310 includes a first layer of grating 502 and a second layer of grating 504. The first layer of grating 502 has a plurality of first grating structures 506a. The second layer of grating 504 has a plurality of second grating structures 508a. An incident light Iin incident at a given incident angle θ has to pass between two adjacent first grating structures 506a and two adjacent second grating structures 508a to reach first light sensor 304a. The first layer of grating 502 and second layer of grating 504 are disposed relative to each other such that an incident light Iin is selectively permitted to pass through them and reach the first light sensor 304a, based upon an incident angle θ of the incident light.

The first negative directional light filter 312 includes a third layer of grating 512 and a second layer of grating 514. The third layer of grating 512 has a plurality of third grating structures 516a. The fourth layer of grating 514 has a plurality of fourth grating structures 518a. An incident light Iin incident at a given incident angle θ has to pass between two adjacent third grating structures 516a and two adjacent fourth grating structures 518a to reach first light sensor 304b. The third layer of grating 512 and fourth layer of grating 514 are disposed relative to each other such that an incident light Iin is selectively permitted to pass through them and reach the first light sensor 304b, based upon an incident angle θ of the incident light.

As one skilled in the art appreciates, the incident light Iin with an incident angle of 0, as shown by line 520a, passes between two adjacent first grating structures 506a and two adjacent second grating structures 508a to reach the first light sensor 304a. Similarly, the incident light Iin with an incident angle of θ, as shown by line 520b, passes between two adjacent third grating structures 516a and two adjacent fourth grating structures 518a to reach the first light sensor 304b.

As previously disclosed, the first positive directional light filter 310 and first negative directional light filter 312 are constructed such that amount of light passed through them have opposite dependency to the incident angle of the incident light. For example, the first grating structure 506a and the second grating structure 508a are arranged such that an incident light with a positive incident angle of θ, as shown by line 522a passes between two adjacent first grating structures 506a and two adjacent second grating structures 508a to reach the first light sensor 304a. However, the third grating structure 516a and the fourth grating structure 518a are arranged such that an incident light with same positive incident angle of θ, as shown by line 522b does not pass between two adjacent first grating structures 506a and two adjacent second grating structures 508a to reach the first light sensor 304b.

Similarly, the first grating structure 506a and the second grating structure 508a are arranged such that an incident light with a negative incident angle of θ, as shown by line 524a does not pass between two adjacent first grating structures 506a and two adjacent second grating structures 508a to reach the first light sensor 304a. However, the third grating structure 516a and the fourth grating structure 518a are arranged such that an incident light with same negative incident angle of θ, as shown by line 524b passes between two adjacent first grating structures 506a and two adjacent second grating structures 508a to reach the first light sensor 304b.

As one skilled in the art appreciates, first layer of grating 502 and third layer of grating 512 may be formed on a single layer, with selective placement of first grating structures 506a and 516a. Similarly, second layer of grating 504 and fourth layer of grating 514 may be formed on a single layer, with selective placement of third grating structures 508a and 518a. Further, another pair of directional pixels may be formed along an axis orthogonal to the pair of directional pixels 500 described with reference to FIGS. 5 and 5A, to determine the incident angle of incident light along Y axis.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. An image stabilization system, comprising:
   a first pair of light sensors placed along an axis relative to a first axis, each light sensor of the first pair of light sensors configured to provide a signal indicative of intensity of light received by the light sensor;
   a first directional light filter configured to selectively permit passage of incident light to each light sensor of the first pair of light sensors based on an angle of the incident light with reference to the first axis; and
   an image stabilization circuit configured to receive a pair of signals indicative of the intensity of light received from the first pair of light sensors and generate a first signal indicative of a change in the angle of the incident light with reference to the first axis, wherein the first signal indicative of a change in the angle of the incident light with reference to the first axis is proportional to a quotient of a difference between the intensity of the pair of signals divided by a sum of the intensity of the pair of signals.

2. The system of claim 1, further including:
   an image sensor array configured to receive the incident light to form an image; and
   a correction assembly configured to maintain the position of the image formed on the image sensor array substantially same, based on the first signal indicative of the change in angle of the incident light.

3. The system of claim 2, wherein the correction assembly is configured to move the image sensor array based on the first signal to maintain the position of the image formed on the image sensor array to be substantially same.

4. The system of claim 2, further including a lens assembly to focus the image on the image sensor array and the correction assembly is configured to move the lens assembly based on the first signal to maintain the position of the image formed on the image sensor array to be substantially same.

5. The system of claim 2, further including a housing, the housing including a lens assembly to focus the image on the image sensor array, the correction assembly is configured to move the housing based on the first signal to maintain the position of the image formed on the image sensor array to be substantially same.

6. The system of claim 1, further including:
   an image sensor array configured to receive the incident light to form an image;
   an image processor to generate image data corresponding to the formed image; and
   an electronic image stabilization module configured to modify the image data to correct a motion of the image formed on the image sensor array along the first axis, based on the first signal indicative of the change in the incident angle with reference to the first axis.

7. The system of claim 1, further including:
   an image sensor array configured to receive the incident light to form an image; and
   an image post processing circuit to
      receive image data from the image sensor array; and
      correct the image data corresponding to the first pair of light sensors based on the first signal indicative of the angle of the incident light with reference to the first axis.

8. The system of claim 1, wherein the first directional filter includes a first layer of grating and a second layer of grating disposed relative to each other such that the incident light incident at an angle substantially perpendicular to the first axis substantially passes through the first layer of grating and the second layer of grating to reach the first pair of light sensors such that the amount of light reaching the first sensor and the second sensor of the first pair of sensors are substantially same; and
   the incident light incident at an angle other than at an angle substantially perpendicular to the first axis selectively passes through the first layer and the second layer, such that the amount of light reaching the first sensor and second sensor of the first pair of sensors are different.

9. An image stabilization system, comprising:
   a first pair of light sensors placed along an axis relative to a first axis, each light sensor configured to provide a signal indicative of intensity of light received by the light sensor;
   a first directional light filter configured to selectively permit passage of incident light to the first pair of light sensors based on an angle of the incident light with reference to the first axis;
   an image stabilization circuit configured to receive a pair of signals from the first pair of light sensors and generate a first signal indicative of a change in the angle of the incident light with reference to the first axis;
   a second pair of light sensors placed along a second axis, each light sensor configured to provide a signal indicative of the intensity of light received by the light sensor and the second axis is substantially perpendicular to the first axis;
   a second directional light filter configured to selectively permit passage of incident light to the second pair of light sensors based on an incident angle of the incident light with reference to the second axis; and the image stabilization circuit configured to receive a pair of signals from the second pair of light sensors and generate a second signal indicative of a change in the angle of the incident light with reference to the second axis.

10. The system of claim 9, wherein
an image sensor array is configured to receive the incident light to form an image;
a correction assembly;
a first correction signal applied to the correction assembly to maintain the position of the image formed on the image sensor array substantially same, based on the first signal indicative of the change in angle of the incident light with reference to the first axis; and
a second correction signal applied to the correction assembly to maintain the position of the image formed on the image sensor array substantially same, based on the second signal indicative of the change in angle of the incident light with reference to the second axis.

11. The system of claim 10, wherein the first pair of light sensors and the second pair of light sensors form a subset of the image sensors of the image sensor array.

12. The system of claim 9, further including:
an image sensor array configured to receive the incident light to form an image;
an image processor to generate image data corresponding to the formed image; and
an electronic image stabilization module configured to modify the image data to correct a motion of the image formed on the image sensor array along the first axis, based on the first signal indicative of the change in the incident angle with reference to the first axis; and
correct another motion of the image formed on the image sensor array along the second axis, based on the second signal indicative of the change in the incident angle with reference to the second axis.

13. The system of claim 12, wherein the first pair of light sensors and the second pair of light sensors form a subset of the image sensors of the image sensor array.

14. The system of claim 9, further including:
an image sensor array configured to receive the incident light to form an image; and
an image post processing circuit to
receive image data from the image sensor array;
correct the image data corresponding to the first pair of light sensors based on the first signal indicative of the angle of the incident light with reference to the first axis; and
correct the image data corresponding to the second pair of light sensors based on the second signal indicative of the angle of the incident light with reference to the second axis.

15. The system of claim 9, wherein the second directional filter includes a third layer of grating and a fourth layer of grating disposed relative to each other such that the incident light incident at an angle substantially perpendicular to the second axis substantially passes through the third layer of grating and the fourth layer of grating to reach the second pair of light sensors such that the amount of light reaching the first sensor and the second sensor of the second pair of sensors are substantially same; and
the incident light incident at an angle other than at an angle substantially perpendicular to the second axis selectively passes through the third layer and the fourth layer, such that the amount of light reaching the first sensor and second sensor of the second pair of sensors are different.

16. The system of claim 9, wherein the first signal is proportional to a quotient of a difference between the intensity of the pair of signals from the first pair of light sensors divided by a sum of the intensity of the pair of signals from the first pair of light sensors.

17. The system of claim 9, wherein the second signal is proportional to a quotient of a difference between the intensity of the pair of signals from the second pair of light sensors divided by a sum of the intensity of the pair of signals from the second pair of light sensors.

18. A method for image stabilization, comprising:
providing a first pair of light sensors placed along an axis relative to a first axis, each light sensor of the first pair of light sensor configured to provide a signal indicative of intensity of light received by the light sensor;
providing a first directional light filter configured to selectively permit passage of incident light to each light sensor of the first pair of light sensors based on an angle of the incident light with reference to the first axis; and
providing an image stabilization circuit configured to receive a pair of signals indicative of the intensity of light received from the first pair of light sensors and generating a first signal indicative of a change in the angle of the incident light with reference to the first axis, wherein the first signal indicative of a change in the angle of the incident light with reference to the first axis is proportional to a quotient of a difference between the intensity of the pair of signals divided by a sum of the intensity of the pair of signals.

19. The method of claim 18, further including:
providing an image sensor array to receive the incident light to form an image;
providing a correction assembly to maintain the position of the image formed on the image sensor array substantially same, based on the first signal indicative of the change in angle of the incident light.

20. The method of claim 19, wherein the correction assembly is configured to move the image sensor array based on the first signal to maintain the position of the image formed on the image sensor array to be substantially same.

21. The method of claim 19, further including a lens assembly to focus the image on the image sensor array and the correction assembly is configured to move the lens assembly based on the first signal to maintain the position of the image formed on the image sensor array to be substantially same.

22. The method of claim 19, further including a housing, the housing including a lens assembly to focus the image on the image sensor array, the correction assembly is configured to move the housing based on the first signal to maintain the position of the image formed on the image sensor array to be substantially same.

23. The method of claim 18, further including:
providing an image sensor array configured to receive the incident light to form an image;
providing an image processor to generate image data corresponding to the formed image; and
providing an electronic image stabilization module configured to modify the image data to correct a motion of the image formed on the image sensor array along the first axis, based on the first signal indicative of the change in the incident angle with reference to the first axis.

24. The method of claim 18, further including:
providing an image sensor array configured to receive the incident light to form an image; and
providing an image post processing circuit to
receive image data from the image sensor array; and correct the image data corresponding to the first pair of light sensors based on the first signal indicative of the angle of the incident light with reference to the first axis.

25. The method of claim 18, wherein the first directional filter includes a first layer of grating and a second layer of grating disposed relative to each other such that
the incident light incident at an angle substantially perpendicular to the first axis substantially passes through the first layer of grating and the second layer of grating to reach the first pair of light sensors such that the amount of light reaching the first sensor and the second sensor of the first pair of sensors are substantially same; and
the incident light incident at an angle other than at an angle substantially perpendicular to the first axis selectively passes through the first layer and the second layer, such that the amount of light reaching the first sensor and second sensor of the first pair of sensors are different.

26. A method for image stabilization, comprising:
providing a first pair of light sensors placed along an axis relative to a first axis, each light sensor configured to provide a signal indicative of intensity of light received by the light sensor;
providing a first directional light filter configured to selectively permit passage of incident light to the first pair of light sensors based on an angle of the incident light with reference to the first axis;
providing an image stabilization circuit configured to receive a pair of signals from the first pair of light sensors and generate a first signal indicative of a change in the angle of the incident light with reference to the first axis;
providing a second pair of light sensors placed along a second axis, each light sensor configured to provide a signal indicative of the intensity of light received by the light sensor and the second axis is substantially perpendicular to the first axis;
providing a second directional light filter configured to selectively permit passage of incident light to the second pair of light sensors based on an incident angle of the incident light with reference to the second axis; and
providing an image stabilization circuit configured to receive a pair of signals from the second pair of light sensors and generate a second signal indicative of a change in the angle of the incident light with reference to the second axis.

27. The method of claim 26, further including:
providing an image sensor array configured to receive the incident light to form an image;
providing a correction assembly;
applying a first correction signal to the correction assembly to maintain the position of the image formed on the image sensor array substantially same, based on the first signal indicative of the change in angle of the incident light with reference to the first axis; and
applying a second correction signal to the correction assembly to maintain the position of the image formed on the image sensor array substantially same, based on the second signal indicative of the change in angle of the incident light with reference to the second axis.

28. The method of claim 27, wherein the first pair of light sensors and the second pair of light sensors form a subset of the image sensors of the image sensor array.

29. The method of claim 26, further including:
providing an image sensor array configured to receive the incident light to form an image;
providing an image processor to generate image data corresponding to the formed image; and
providing an electronic image stabilization module configured to modify the image data to correct a motion of the image formed on the image sensor array along the first axis, based on the first signal indicative of the change in the incident angle with reference to the first axis; and
correct another motion of the image formed on the image sensor array along the second axis, based on the second signal indicative of the change in the incident angle with reference to the second axis.

30. The method of claim 29, wherein the first pair of light sensors and the second pair of light sensors form a subset of the image sensors of the image sensor array.

31. The method of claim 26, further including:
providing an image sensor array configured to receive the incident light to form an image; and
providing an image post processing circuit to
receive image data from the image sensor array;
correct the image data corresponding to the first pair of light sensors based on the first signal indicative of the angle of the incident light with reference to the first axis; and
correct the image data corresponding to the second pair of light sensors based on the second signal indicative of the angle of the incident light with reference to the second axis.

32. The method of claim 26, wherein the second directional filter includes a third layer of grating and a fourth layer of grating disposed relative to each other such that
the incident light incident at an angle substantially perpendicular to the second axis substantially passes through the third layer of grating and the fourth layer of grating to reach the second pair of light sensors such that the amount of light reaching the first sensor and the second sensor of the second pair of sensors are substantially same; and
the incident light incident at an angle other than at an angle substantially perpendicular to the second axis selectively passes through the third layer and the fourth layer, such that the amount of light reaching the first sensor and second sensor of the second pair of sensors are different.

33. The method of claim 26, wherein the first signal is proportional to a quotient of a difference between the intensity of the pair of signals from the first pair of light sensors divided by a sum of the intensity of the pair of signals from the first pair of light sensors.

34. The system of claim 26, wherein the second signal is proportional to a quotient of a difference between the intensity of the pair of signals from the second pair of light sensors divided by a sum of the intensity of the pair of signals from the second pair of light sensors.

* * * * *